T. SLOPER.
MANUFACTURE OF ARTICLES BUILT UP FROM LENGTHS OF CORD.
APPLICATION FILED DEC. 10, 1910.
1,009,192.
Patented Nov. 21, 1911.
4 SHEETS—SHEET 1.
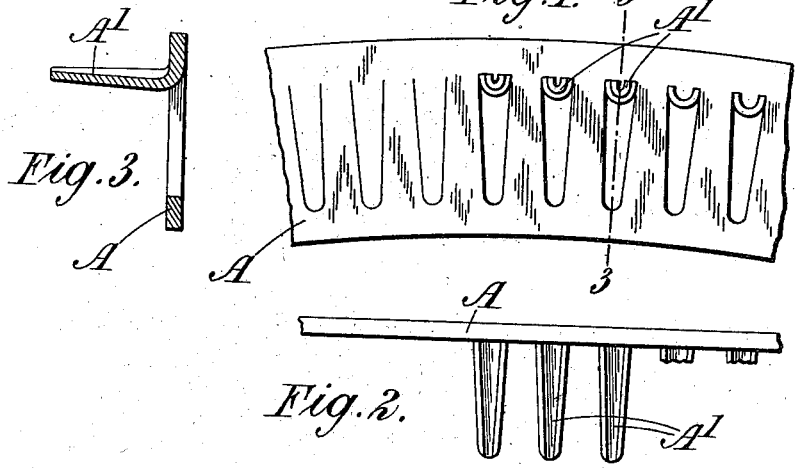
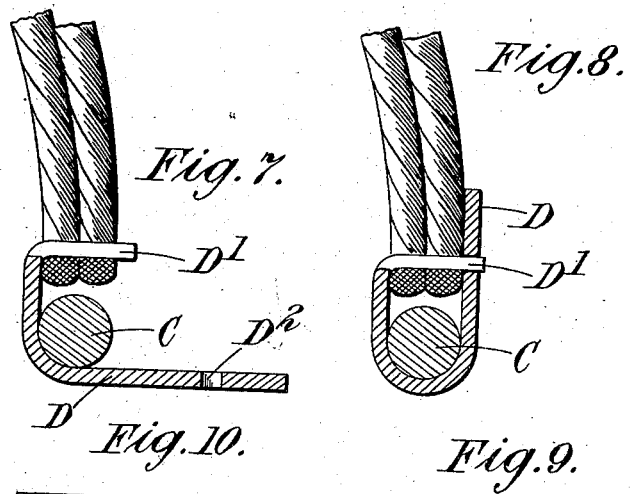
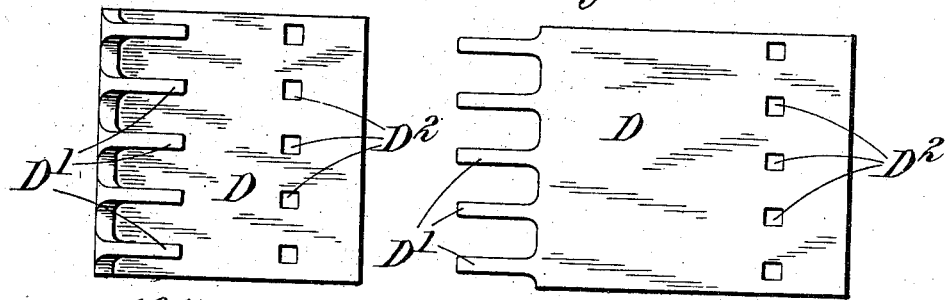
Witnesses:
M. C. Bender
C. S. Brown
Inventor:
Thomas Sloper
by Foster Freeman Watson Hart
Attys T. SLOPER.
MANUFACTURE OF ARTICLES BUILT UP FROM LENGTHS OF CORD.
APPLICATION FILED DEC. 10, 1910.
1,009,192.
Patented Nov. 21, 1911.
4 SHEETS—SHEET 2.
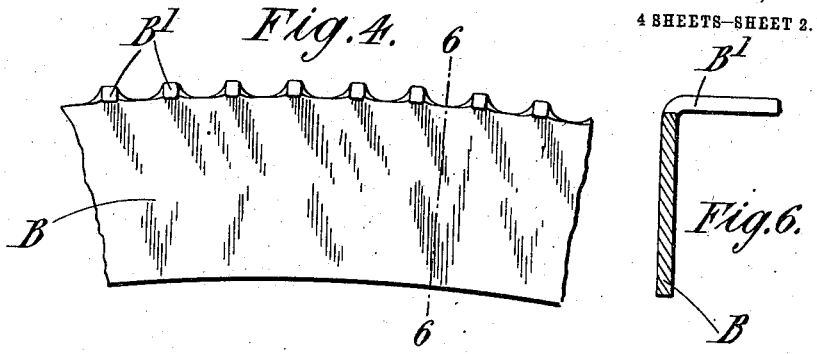
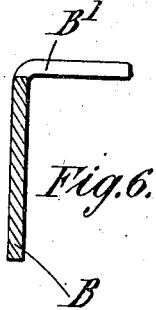
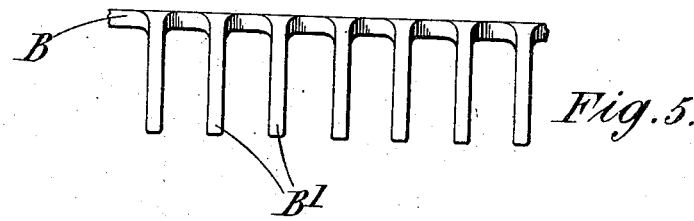
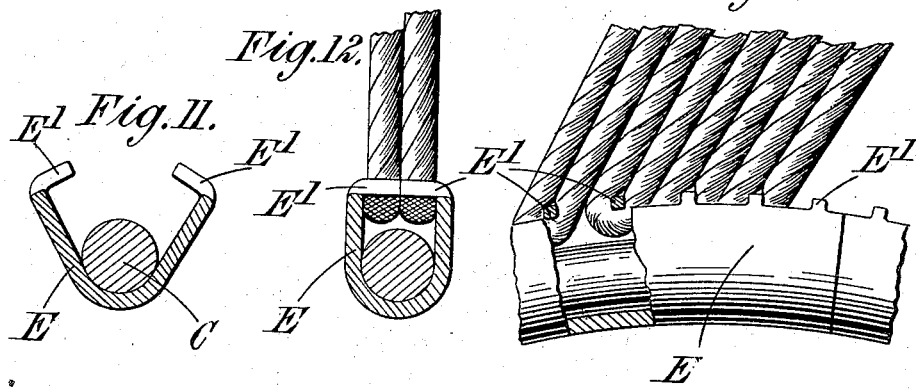
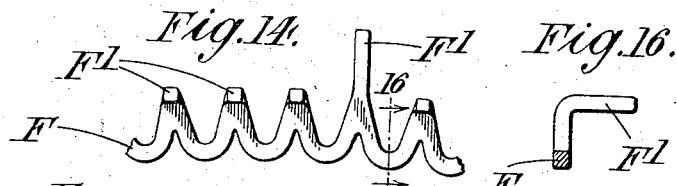

T. SLOPER.
MANUFACTURE OF ARTICLES BUILT UP FROM LENGTHS OF CORD.
APPLICATION FILED DEC. 10, 1910.
1,009,192.
Patented Nov. 21, 1911.
4 SHEETS—SHEET 3
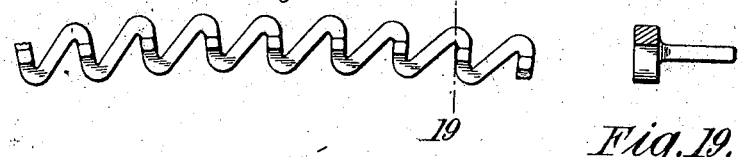
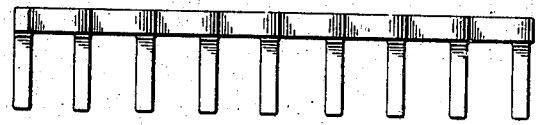
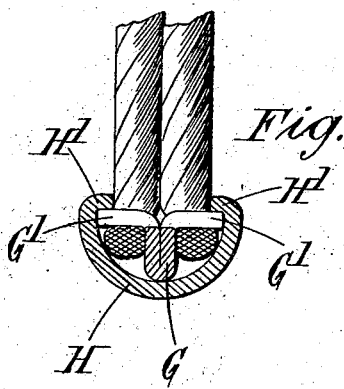
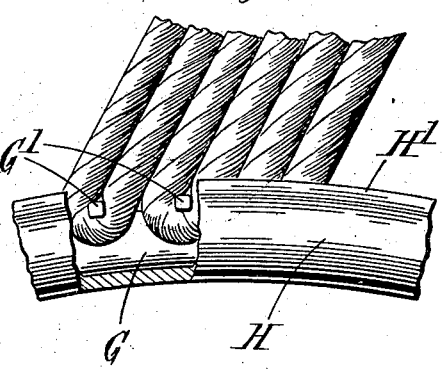
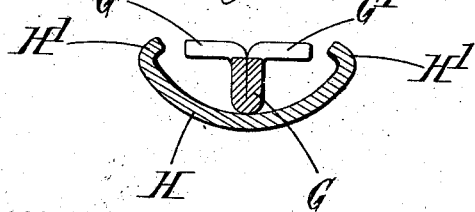

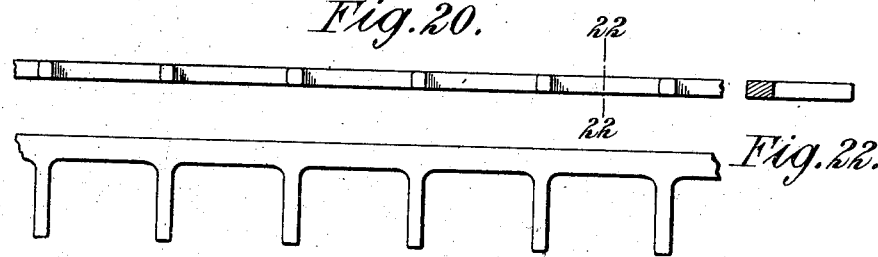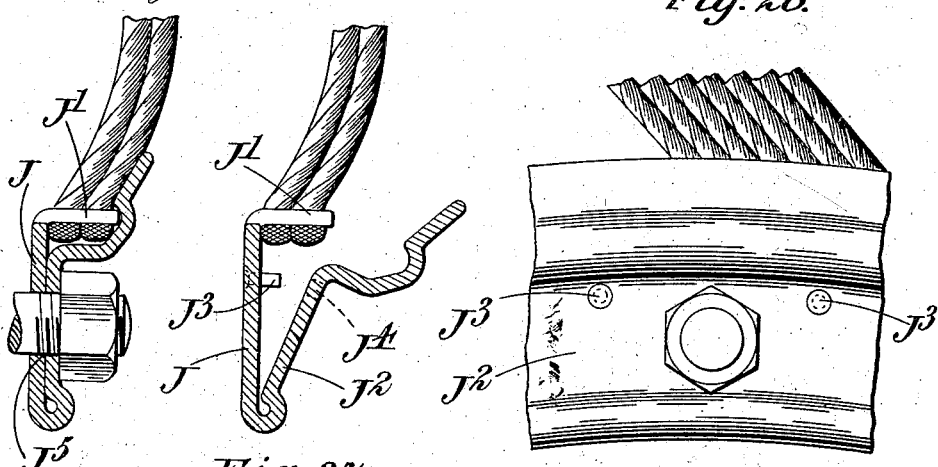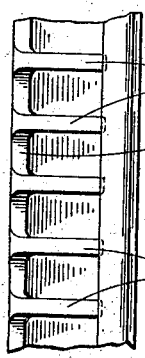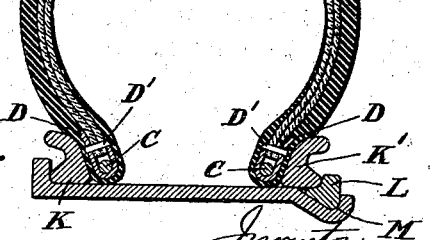

UNITED STATES PATENT OFFICE.

THOMAS SLOPER, OF DEVIZES, ENGLAND.

MANUFACTURE OF ARTICLES BUILT UP FROM LENGTHS OF CORD.

1,009,192.  Specification of Letters Patent.  Patented Nov. 21, 1911.

Application filed December 10, 1910. Serial No. 596,675.

*To all whom it may concern:*

Be it known that I, THOMAS SLOPER, a subject of the King of England, residing at Devizes, Wiltshire, England, have invented certain new and useful Improvements in Manufacture of Articles Built Up from Lengths of Cord, of which the following is a specification.

This invention is for improvements in or relating to the manufacture of articles or fabric built up from lengths of rubbered cord or other material and has for its object to provide better anchoring means for the lengths of material that are used or that are built together.

As is well known in building up an article or fabric from lengths of material for example rubbered cord, which may be composed of a single length of cord doubled backward and forward upon itself, so that it provides a series of lengths laid side by side, it is often required to secure those portions which form the edge of the article or fabric together by some form of anchoring means. Among other methods this securing has before been effected by sewing or by metal staples or pins around which the lengths of cord were passed and which staples or pins were afterward secured in an edging. According to one method, for example, if building a tire from rubbered cord the length of cord was bent backward and forward around pins or staples detachably carried by a suitable "former" and after the tire had been thus built up, the fabric with the pins or staples or it was removed from the "former" and beads were built on to the pins or staples so that a secure anchorage was afforded for all the cords.

According to one feature of this invention, an anchoring member is provided for building into the article or fabric to be formed, comprising a strip or ring of metal provided with claws or projections integral therewith to receive the lengths of rubbered or other cord. Conveniently the claws or projections are stamped up from the main body of the strip or ring. For a tire the anchoring member may be made of sufficient strength to take the place of the wire commonly inserted in the edge of the cover, or it may be made to carry the wire. The anchoring member may further be so constructed that it is itself inextensible but flexible in one or more directions, or it may be both flexible and extensible.

In the accompanying drawings, which illustrate various forms of anchoring members according to this invention, Figure 1 is a side elevation of a strip or ring provided with lateral claws or projections; Fig. 2 is a plan of the same; Fig. 3 is a section on the line 3—3 of Fig. 1; Fig. 4 is a side elevation of another form of strip or ring; Fig. 5 is a plan of the same; Fig. 6 is a section on the line 6—6 of Fig. 4; Fig. 7 is a transverse section of another form of anchoring member partly bent into position; Fig. 8 is a transverse section of the same member bent into final position; Fig. 9 is a plan of the member in the flat; Fig. 10 is a plan of the member when bent into the form shown in Fig. 7; Fig. 11 is a section through another form of anchoring member partly bent into position; Fig. 12 is a similar view with the member brought into final position; Fig. 13 is a side elevation of the same member, part being broken away for the sake of clearness; Fig. 14 is a side elevation of another form of anchoring member; Fig. 15 is a plan of the same; Fig. 16 is a section on the line 16—16 of Fig. 14; Fig. 17 is a side elevation of yet another form of anchoring member; Fig. 18 is a plan of the same; Fig. 19 is a section on the line 19—19 of Fig. 17; Fig. 20 is a side elevation of another form of anchoring member; Fig. 21 is a plan of the same; Fig. 22 is a section on the line 22—22 of Fig. 20; Fig. 23 is a transverse section through another form of anchoring member, showing the parts in final position; Fig. 24 is a side elevation of the same member, part being broken away for the sake of clearness; Fig. 25 is a similar view to Fig. 23, but showing the method of bringing the parts into position; Fig. 26 is a section through another form of anchoring member; Fig. 27 shows the method of bringing the parts illustrated in Fig. 26 into position; Fig. 28 is a side elevation of the member shown in Fig. 26; Fig. 29 is a plan of the same; Fig. 30 is a transverse section of a wheel rim and tire.

Like letters indicate like parts throughout the drawings.

The anchoring members are conveniently stamped from sheet metal and in Figs. 1–3 laterally disposed claws or projections A′ are shown as stamped up from a strip or ring of metal A. The strip of metal may constitute part of a ring suitable for securing to the edge of a tire, or the metal piece may be in the form of an endless ring. Two such rings, whether endless or built up of sections, may be placed one on each side of a "former" such as is now commonly used for building tires and the cord, or other length of material of which the tire is to be built, may be then bent around each of the pins A′ in turn and carried backward and forward over the "former" according to usual practice, the pins or claws A′ taking the place of the separate detachable pins heretofore employed with such "formers." The pins or projections A′, together with the strips or rings A are thus built into the tire and the whole can afterward be vulcanized together. That portion of the ring that lies between the pins and the center may be employed to carry a bead or may be itself bent around to form a bead, as found convenient. In Fig. 1, the three claws or projections on the left hand side are shown as only broken away from the main body of the strip, but not bent up into position, and the two claws on the right hand side are shown in section close to the root of the claw. Each claw is tapered and is made trough-shaped, as is clearly shown, to give it increased strength.

In Figs. 4 to 6, a strip or ring B is shown having claws B′ stamped up from its edge.

In Fig. 7 a method is shown of inclosing a wire C by the anchoring strip or ring that is built into the tire. The strip or ring D for this purpose is built up of a number of sections one of which is shown in the flat in Fig. 9. Each of said sections or blanks is provided with claws D′ at one edge and near the opposite edge are orifices D² corresponding to the claws. Before the cords of the fabric are placed over the claws D′ the latter are bent up at an angle to the body of the blank and the blank is bent, for example, into the form shown in Fig. 7 to receive the endless wire C. After the cords have been engaged with the claws and the wire C positioned as shown in Fig. 7, the body of the section or blank is further bent upon itself around the wire C, so that it is made to take the shape shown in Fig. 8, the ends of the claws D′ projecting into the holes D².

Fig. 30 illustrates a wheel rim carrying a tire provided with anchoring strips C above described. This rim is of well-known construction and comprises endless rings K, K′ that keep the tire in place and a further endless ring L that is sprung into a recess M in the rim and keeps the ring K′ from being displaced.

In Figs. 11 to 13, a strip or plate E constituting one of a number of sections is shown having claws E′ at each edge. One edge of this strip is folded over upon the other, so that the claws face each other, those of one side receiving one layer of cord and those on the other edge receiving the other layer as shown in Fig. 12.

If it is desired to render the anchoring member flexible, the main body of the strip or ring may be cut away, as shown in Figs. 14 to 16, so that only a skeleton plate F is left of wavy construction having claws F′ at the crests of the waves or undulations. This is easily stamped from the flat, as will be seen, one claw being shown extended in the flat prior to its being bent into position at right angles to the main body of the strip. This anchoring member would be flexible laterally and would also be slightly extensible.

Another form of strip or ring giving greater flexiblity and also increased extensibility is shown in Figs. 17 to 19. This can be stamped from a strip of flat material, the plane of which would be the same as that occupied by the claws when finished, the body of the material being corrugated between the claws to give the desired flexibility and extensibility.

In Figs. 20 to 22 a strip is shown that is narrow in its transverse dimensions, so that it has lateral flexibility, but is inextensible owing to the body of the strip lying all in one line.

It will be seen that in Figs. 11 to 13, the anchoring member forms an inclosing casing for the edge of the tire and constitutes a metallic bead having within it the inextensible wire. If desired, the casing effect may be obtained by making the anchoring member in two parts, whereof one is a U-shaped strip or ring G having pins or claws G′ at both edges which extend laterally from the ring, as shown in Figs. 23, 24 and 25. The cords of the fabric are fastened around the claws G′ and then a trough-shaped member H which may be in the form of an endless ring or in sections forming parts of a ring, is bent around the edge of the tire and locked over the ends of the claws, the trough or casing member H having inwardly turned edges H′ for the purpose of engaging the pins and holding the casing member in place.

In Fig. 25 the trough-shaped member is shown ready for bending over the edge of the fabric and the pins G′.

In some cases it may be desired to make the main body of the strip or ring of sufficient dimensions and sufficiently stout to enable it to be bolted direct to the road-wheel whereon the tire is to be employed, so that the anchoring member constitutes the direct connection between the tire and the wheel instead of the edges of the tire being held in a rim or between separate flanges secured to the wheel. This construction would be particularly suitable for motor 'buses and is shown in Figs. 26 to 29. The strip or ring J which may be divided into any convenient number of sections has claws J' formed at one edge to receive the cords of the fabric and is conveniently made of sufficient width so that the half $J^2$ not carrying the claws J' can be bent back over the portion that carries the claws. This half $J^2$ may be shaped to cover in the edge of the tire and also overlap the same, as clearly shown in Fig. 26. Studs $J^3$ may be provided on the claw-carrying portion of the strip or ring and that part which is folded over may have in it corresponding orifices $J^4$ to receive the studs. If desired, the studs may be riveted after the folding operation has been completed. Both the claw-carrying half and the folded half of the rim are provided with orifices $J^5$ at intervals to receive bolts, whereby the anchoring members may be fastened to the road-wheel. The object of dividing the rings J into sections is to enable them to be placed over the wheel with which the tire is to be used.

What I claim as my invention and desire to secure by Letters Patent is:—

1. In an article composed of lengths of cord, the combination with such lengths of cord, of a strip of metal having claws around which the cord lengths are passed as an anchorage, substantially as set forth.

2. In an article of circular form composed of lengths of cord the combination with such lengths of cord, of an endless strip or ring of metal having claws around which the cord lengths are passed as an anchorage, substantially as set forth.

3. In a tire composed of lengths of cord the combination with such lengths of cord, of an endless strip or ring of metal disposed at the inner edge of the tire and having claws around which the cord lengths are passed as an anchorage, substantially as set forth.

4. In a tire composed of lengths of cord the combination with such lengths of cord, of an endless strip or ring of metal disposed at the inner edge of the tire and having claws around which the cord lengths are passed as an anchorage, such strip being further provided with means for carrying an endless wire, substantially as set forth.

5. In a tire composed of lengths of cord the combination of, an endless strip or ring of metal disposed at the edge of the tire and having claws around which the cord lengths are passed as an anchorage, such strip further having a groove or channel whose concave face is directed away from the central horizontal axis of the tire, and an endless wire carried in such channel, substantially as set forth.

6. In an article composed of lengths of cord the combination with such lengths of cord, of a strip of metal having claws stamped up from the main body of the strip around which the claws of the cord lengths are passed as an anchorage, substantially as set forth.

7. In an article composed of lengths of cord the combination with such lengths of cord, of a strip of metal having claws around which the cord lengths are passed as an anchorage, and having an extension which is bent over the claws to prevent the removal of the fabric therefrom substantially as set forth.

8. In an article composed of lengths of cord the combination with such lengths of cord of a strip of metal having claws around which the cord lengths are passed as an anchorage and having an extension which is bent over the claws to prevent the removal of the fabric therefrom such extension being so bent as to provide a channel closed on that side toward a horizontal axis central with the tire, substantially as set forth.

In testimony whereof I have signed my name to this specification in the presence of two subscribing witnesses.

THOMAS SLOPER.

Witnesses:
 HAROLD PARSONS,
 JAMES ARBEN.